United States Patent [19]

Abt et al.

[11] Patent Number: 4,665,742

[45] Date of Patent: May 19, 1987

[54] METHOD FOR DETERMINING THE CLOSING POINT OF A PUMP PISTON RELATIVE TO A TRANSVERSE BORE IN THE PUMP CYLINDER

[75] Inventors: Jürgen Abt, Gerlingen; Heins Bollhagen, Leonberg; Dieter Handtmann, Sindelfingen; Ulrich Kuhn, Renningen; Sybille Stumpf, Markgröningen, all of Fed. Rep. of Germany

[73] Assignee: Robert Bosch GmbH, Stuttgart, Fed. Rep. of Germany

[21] Appl. No.: 763,358

[22] Filed: Aug. 7, 1985

[30] Foreign Application Priority Data

Sep. 22, 1984 [DE] Fed. Rep. of Germany ....... 3434867

[51] Int. Cl.[4] .......................................... G01M 19/00

[52] U.S. Cl. ........................................ 73/168; 73/37; 73/119 A

[58] Field of Search ..................... 73/119 A, 37, 37.9, 73/168; 417/63

[56] References Cited

U.S. PATENT DOCUMENTS 2,979,945 4/1961 Tibbetts ............................ 73/37 X

FOREIGN PATENT DOCUMENTS 131744 10/1980 Japan .................................... 73/37

*Primary Examiner*—Jerry W. Myracle

*Attorney, Agent, or Firm*—Michael J. Striker

[57] ABSTRACT

A method for determining the closing point of a pump piston relative to a transverse bore in a corresponding pump cylinder, the method including the steps of providing compressed air to the cylinder via the transverse bore, axially sliding the pump piston near the closing point, consecutively measuring two flow values through a throttle cross-section defined by the pump piston and transverse bore, measuring the positions of the piston corresponding to the two flow values and extrapolating the pump piston unto the closing point from the flow values and piston positions.

8 Claims, 2 Drawing Figures

METHOD FOR DETERMINING THE CLOSING POINT OF A PUMP PISTON RELATIVE TO A TRANSVERSE BORE IN THE PUMP CYLINDER

BACKGROUND OF THE INVENTION

The present invention relates to a method for determining the closing point of a pump piston relative to a transverse bore in the corresponding pump cylinder. In a known method the pressure rise caused by closing the transverse bore with the pump piston is utilized to determine the end point. Such a method is known from my U.S. patent application Ser. No. 542,070 now U.S. Pat. No. 4,546,648. To accomplish this method a test fluid must be used, thereby resulting in relatively large equipment expenses. Another disadvantage of the known method is that it is only usable for the named purpose.

SUMMARY OF THE INVENTION

It is an object of the present invention to provide a method which overcomes the disadvantages of the prior art.

It is a further object to provide a particularly accurate method of determining the closing point of the pump piston relative to the transverse bore in the pump cylinder.

Additionally, it is an object to provide a method which can also quantitatively detect and estimate edge flaws on the piston or the transverse bore and in addition the piston clearance.

Pursuant to these objects and others which will become apparent hereinafter, one aspect of the invention resides in extrapolating the closing point by measuring two flow values and their respective positions during sliding of the pump piston in the vicinity of the closing point.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
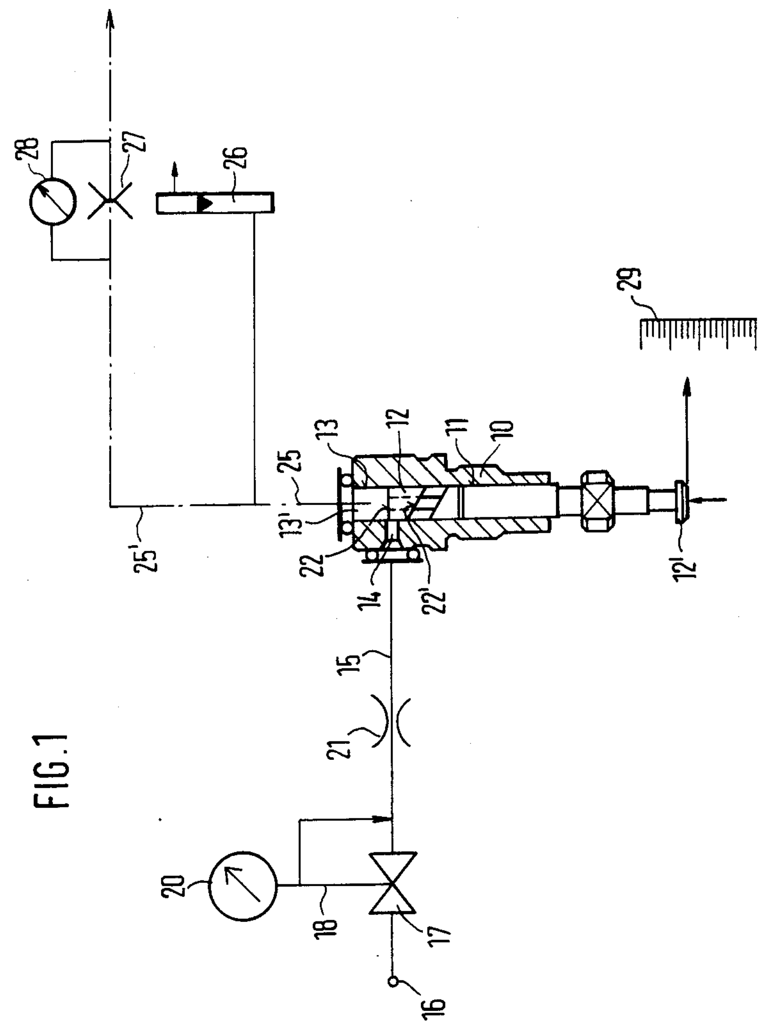
FIG. 1 is a simplified view of an arrangement for accomplishing the method of the present invention.

FIG. 1 illustrates a pump cylinder 10 having a longitudinal bore 11 in which a pump piston 12 is closely slidably guided. The pump piston 12 has a front face projecting out of the pump cylinder 10, the front face contacting a not illustrated cam or eccentric to provide the piston 12 with back and forth motion. The upper portion of the longitudinal bore 11 forms an exit 13'. A transverse bore 14 penetrates into the longitudinal bore 11 somewhat under the upper end of the pump cylinder 10. A line 15 from an air pressure source 16 is connected to the transverse bore 14. A pressure control valve 17 is provided in the line 15. From the pressure control valve 17 a line 18 leads to a manometer 20. A throttle 21 is provided in the line 15 between the pressure control valve 17 and the pump cylinder 10. With the help of the pressure regulator 17 the line 15 is provided with a constant supply pressure $p_e$ so that a major pressure ratio exists at a changeable throttle cross-section formed by the transverse bore 14 and an upper or lower leading edge 22, 22' of the pump piston 12. This pressure ratio for air is $p_e/p_0 > 1.9$, wherein $p_e$ is a pressure in the line 15 and $p_o$ is a pressure downstream of the lower leading edge 22'. The throttle 21 serves merely to limit flow when the transverse bore 14 is completely opened. A line 25 is connected to the exit 13' and leads to a flowmeter 26. Alternatively, the flow quantity can be measured indirectly over the working pressure with help of an orifice 27 which is provided in the line 25' illustrated with a broken line. The pressure drop $\Delta_p$ and the orifice 27 can be read from a manometer 28. The position of the pump piston 12 can be read on the front face 12' by a properly positioned displacement scale 29.

The determination of the closing point of the pump piston 12, that is to say the position of the pump piston, which has migrated so that one of its leading edges 22, 22' just completely closes the transverse bore 14, follows thereby in that through axial sliding of the pump piston 12 in the vicinity of the closing point, two to be provided flow values $Q_2$ and $Q_1$ are consecutively provided and the corresponding positions $s_2$ and $s_1$ of the pump piston 12 are measured on the displacement scale 29. With the help of the pressure regulator 17 a constant inlet pressure $p_e$ is first provided in the line 15 so that a major pressure ratio exists on the changeable throttle cross-section defined by the transverse bore 14 and the leading edge 22 of the pump piston 12. For air $p_e/p_0 > 1.9$ is selected. The flow quantities $Q_1$ and $Q_2$ are measured either on the flow meter 26 or indirectly on the orifice 27.

From the relation derived between the height ($h_i = s_i - s_0$) of the circular segment area of the defined throttle cross-section $A_i$ and the flow quantity, for the purpose of determining a major pressure ratio $p_e/p_0$ on the above-mentioned throttle cross-section $$Q_i = \text{cont} \cdot p_e \cdot A_i \approx \text{const}' \cdot p_e \cdot (s_i - s_0)^{3/2}$$

Using the determined pairs of values $Q_2$, $s_2$ and $Q_1$, $s_1$, the closing point $s_0$ can be calculated:

$$s_o = \frac{(Q_2/Q_1)^{\frac{2}{3}} \cdot s_1 - s_2}{(Q_2/Q_1)^{\frac{2}{3}} - 1}$$

This approximation formula is sufficiently accurate when the control area used for $Q_1$ and $Q_2$ is less than or equal to 1% of the entire open transverse bore 14. By careful selection of the provided values $Q_2$ and $Q_1$, namely $Q_2/Q_1 = \sqrt{8}$ with for example $Q_2 = 800$ ml/min and $Q_1 = 283$ ml/min, the formula is simplified to $$s_o = 2\,s_1 - s_2.$$

A further possibility exists in that the piston is moved into the closing point $s_0$ ascertained from the described extrapolation method, and any leakage flow $Q_0$ in this position is determined. Thereby the quality of the leading edge of the front face 22 of the pump piston can be determined as well as the amount of play between the pump piston and the pump cylinder.

Figure 2:
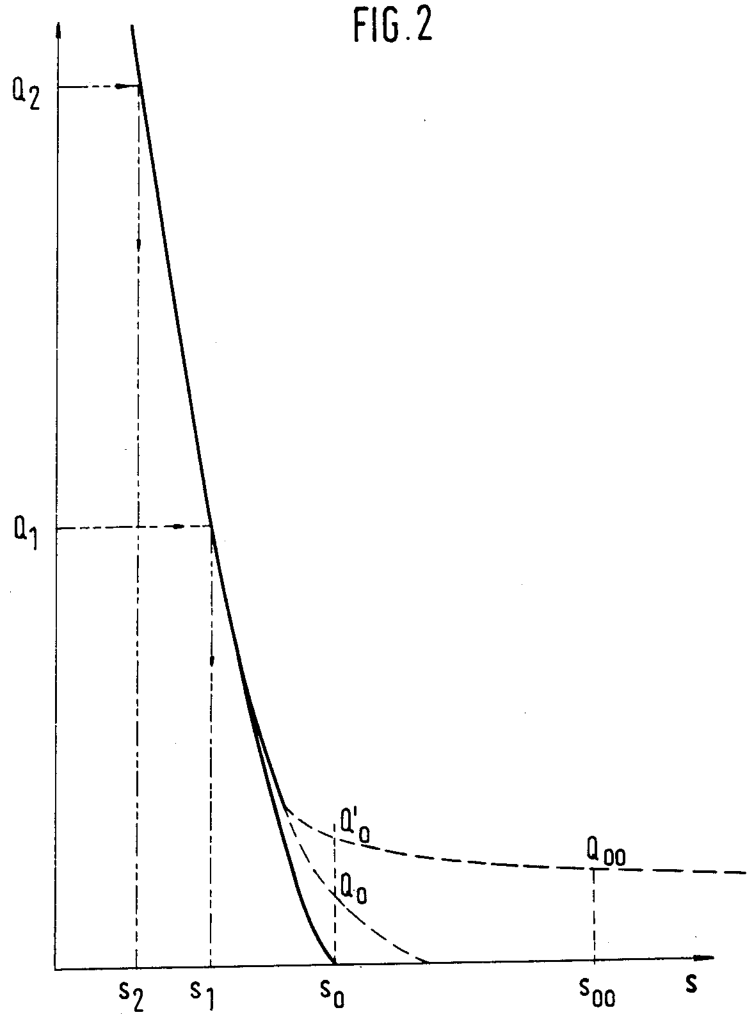
FIG. 2 is a diagram showing the extrapolation of the closing point.

In the diagram in FIG. 2, the displacement of the pump piston 12 is indicated on the abscissa and the flow values through the throttle cross-section are indicated on the ordinate. At the displacement point $s_2$ the value of $Q_2$ is measured, and at displacement point $s_1$ the value $Q_1$ is measured. The closing point $s_0$ is then determined from $s_2$ and $s_1$. The leakage flow $Q_0$ follows from the point $s_0$.

While the invention has been illustrated and described as embodied in a method for determining the closing point of a pump piston relative to a transverse bore in a corresponding pump cylinder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for determining the closing point of a pump piston relative to a transverse bore in a corresponding pump cylinder, the method comprising the steps of:

axially sliding the pump piston near the closing point;

consecutively measuring two flow values through a throttle cross-section defined by the pump piston and the transverse bore;

measuring the positions of the pump piston corresponding to said two flow values; and extrapolating the pump piston, closing point from said flow values and piston positions; and using compressed air as a flow medium.

2. A method as defined in claim 1, wherein said measuring steps includes measuring the flow values and piston positions with a major pressure ratio existing at said throttle cross-section.

3. A method as defined in claim 1, wherein said flow values measuring step includes providing fixed flow values $Q_1$ and $Q_2$ in advance, said position measuring step includes measuring the piston positions corresponding to the fixed flow values.

4. A method as defined in claim 3, wherein said flow values measuring step includes providing fixed flow values with a predetermined relationship.

5. A method as defined in claim 4, wherein said flow values measuring step includes providing fixed flow values having a relationship of $Q_2/Q_1=\sqrt{8}$.

6. A method as defined in claim 4, wherein said flow values measuring step includes providing flow value $Q_2$ as approximately 1% of the maximum flow value if the transverse bore were completely open.

7. A method as defined in claim 4, wherein said flow values measuring step includes providing said flow values so that the total difference between the corresponding piston positions does not exceed roughly 2% of the diameter of the transverse bore, nor have a value under roughly 1% of the diameter of the bore.

8. A method as defined in claim 1, the pump piston and transverse bore having edges; and further comprising the steps of moving the pump piston to the closing point and measuring any flow which may be present in this position for testing the quality of the edges of the pump piston and the transverse bore and determining play between the pump piston and pump cylinder.

* * * * *